United States Patent
Bullard (10) Patent No.: US 10,139,617 B2
(45) Date of Patent: Nov. 27, 2018

(54) REACTION COMPENSATED STEERABLE PLATFORM

(71) Applicant: Raytheon Company, Waltham, MA (US)

(72) Inventor: Andrew L. Bullard, Manhattan Beach, CA (US)

(73) Assignee: Raytheon Company, Waltham, MA (US)

( * ) Notice: Subject to any disclaimer, the term of this patent is extended or adjusted under 35 U.S.C. 154(b) by 159 days.

(21) Appl. No.: 15/050,346

(22) Filed: Feb. 22, 2016

(65) Prior Publication Data
US 2017/0242242 A1    Aug. 24, 2017

(51) Int. Cl.
*G02B 26/08* (2006.01)
*G05D 1/08* (2006.01)
(Continued)

(52) U.S. Cl.
CPC .......... *G02B 26/0816* (2013.01); *B64G 1/22* (2013.01); *G02B 7/1827* (2013.01);
(Continued)

(58) Field of Classification Search
CPC .... G02B 7/001; G02B 7/1822; G02B 7/1827; G02B 7/1828; G02B 7/183; G02B 7/198;
(Continued)

(56) References Cited

U.S. PATENT DOCUMENTS 5,012,170 A * 4/1991 Atlas ...................... B64G 1/283
                                                       318/46
5,283,682 A    2/1994 Ostaszewski
(Continued)

FOREIGN PATENT DOCUMENTS

EP     0381574 A1    8/1990
GB     1146847       3/1969

OTHER PUBLICATIONS

Bullard et al. (Responder fast steering mirror, Proc. SPIE 8889, Sensors, Systems, and Next-Generation Satellites XVII, 88891Q, Oct. 2013).*

(Continued)

*Primary Examiner* — Kimberly N Kakalec (57) ABSTRACT

A reaction compensated steerable platform device is disclosed. The reaction compensated steerable platform device can include a base, a steerable platform movably coupled to the base, and a reaction mass movably coupled to the base. The reaction compensated steerable platform device can also include a primary actuator to cause movement of the steerable platform, and a trim actuator coupled to the reaction mass and the base. In addition, the reaction compensated steerable platform device can include a sensor configured to provide feedback for actuation of the trim actuator. The reaction mass can be configured to move by actuation independent of the trim actuator to compensate for a first portion of a load induced by the movement of the steerable platform. Actuation of the trim actuator can be controlled by the sensor, such that the reaction mass moves to compensate for a second portion of the load induced by the movement of the steerable platform.

22 Claims, 6 Drawing Sheets

(51) Int. Cl.
*G02B 27/64* (2006.01)
*G02B 7/182* (2006.01)
*H02K 41/035* (2006.01)
*B64G 1/22* (2006.01)

(52) U.S. Cl.
CPC ......... *G02B 27/644* (2013.01); *G05D 1/0883* (2013.01); *H02K 41/0354* (2013.01)

(58) Field of Classification Search
CPC .... G02B 27/64; G02B 27/644; G02B 27/646; G02B 27/648; G02B 26/0816; G02B 7/1872; H02K 41/0354; B64G 1/22; G05D 1/0883
See application file for complete search history.

(56) References Cited

U.S. PATENT DOCUMENTS

| | | | |
|---|---|---|---|
| 5,751,078 A | 5/1998 | Loewenthal | |
| 7,009,752 B1* | 3/2006 | Lorell | G02B 7/1821 359/198.1 |
| 9,658,427 B2 | 5/2017 | Bullard et al. | |
| 2003/0184724 A1* | 10/2003 | Ono | G03F 7/70716 355/72 |
| 2008/0166213 A1* | 7/2008 | Hunter | H01L 21/68 414/754 |
| 2012/0241268 A1* | 9/2012 | Laro | F16F 15/03 188/379 |
| 2014/0268383 A1 | 9/2014 | Bullard et al. | |
| 2015/0142182 A1 | 5/2015 | Kimura et al. | |

OTHER PUBLICATIONS

Ball Aerospace & Technologies Corp., Wide Angle Steering Mirror, Ball Aerospace brochure, Aug. 2010, 2 pages, Ball Aerospace & Technologies Corp.

Henderson, Commercial Fast Steering Mirrors, Optics in Motion LLC, Sep. 27, 2009, 12 pages.

Jones et al., State space representation of optical systems, SPIE International Society for Optical Engineering Proceedings, Apr. 28, 2009, 12 pages, vol. 7338, SPIE, Bellingham. Washington.

Left Hand Design Corporation, Fine-Steering Mirrors, to the best of applicant's knowledge article was available before the application filed, 20 pages, Left Hand Design Corporation.

International Search Report for International Application No. PCT/US2016/068334 dated Apr. 7, 2017, 12 pages.

International Search Report for International Application No. PCT/US2016/068345 dated Apr. 10, 2017, 14 pages.

Meline et al., Universal beam steering mirror design using the cross blade flexure, Acquisition, Tracking, and Pointing VI, Nov. 25, 1992, vol. 1697, SPIE Proceedings.

* cited by examiner

FIG. 11

REACTION COMPENSATED STEERABLE PLATFORM

BACKGROUND

Fast moving steering mirrors (FSM) (also known as "beam steering mirrors") are commonly used in high-performance electro-optical sensors or laser systems for pointing laser beams or stabilizing the line of sight of an optical sensor. In many applications the FSM is large enough (e.g., about 2 inch to about 20 inch aperture mirror) that motion of the mirror must be implemented in a way that its exported reaction loads (e.g., "kickback" torque and/or force due to acceleration of the mirror) are compensated for by a mass moving in the opposite direction of the mirror. To be effective, the reaction mass must be driven in such a way that the phase error with the mirror is extremely low to ensure that the exported load is minimized. This is generally accomplished either by driving the reaction mass and the mirror directly against one another so that the reaction mass passively/inherently compensates for the mirror motion or by actively driving the reaction mass with a dedicated separate set of actuators and tilt position sensors.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Although typical passive and active reaction compensated steering mirrors are effective at cancelling or eliminating much of the reaction loads generated by steering the mirror, each of these configurations still suffer from residual or exported loads that remain uncompensated for the reaction masses. The magnitude of the exported loads for passive and active systems depends largely on the balance and alignment (e.g., imperfections and/or tolerances) of the mirror and the reaction mass. Also, the typical passive approach does not provide any control over the position of the reaction mass, which in the event of an external disturbance can result in the reaction mass impacting its travel stops resulting in significant exported load. While the active approach can provide for total control of the reaction mass position, this approach suffers from potential out-of-phase movement of the reaction mass and the mirror, so some residual or exported loads can remain. Thus, the performance of typical passive and active reaction compensated steering mirrors can be improved upon.

Accordingly, in an example, a reaction compensated steerable platform device is disclosed that can provide control of the position of the reaction mass to eliminate or reduce residual or exported loads. In one aspect, the residual or exported loads can be measured and directly compensated for by movement of the reaction mass. The reaction compensated steerable platform device can include a base, a steerable platform movably coupled to the base, and a reaction mass movably coupled to the base. The reaction compensated steerable platform device can also include a primary actuator to cause movement of the steerable platform, and a trim actuator coupled to the reaction mass and the base. In addition, the reaction compensated steerable platform device can include a sensor configured to provide feedback for actuation of the trim actuator. The reaction mass can be configured to move by actuation independent of the trim actuator to compensate for a first portion of a load induced by the movement of the steerable platform. Actuation of the trim actuator can be controlled by the sensor, such that the reaction mass moves to compensate for a second portion of the load induced by the movement of the steerable platform.

In another example, a reaction compensated steerable platform device is also disclosed that can include a base, a steerable platform movably coupled to the base, and a reaction mass movably coupled to the base. The reaction compensated steerable platform device can also include a primary actuator coupled to the steerable platform and the reaction mass. Actuation of the primary actuator can cause the steerable platform and the reaction mass to move. The reaction mass can compensate for a first portion of a load induced by the movement of the steerable platform. The reaction compensated steerable platform device can further include a trim actuator coupled to the reaction mass and the base. In addition, the reaction compensated steerable platform device can include a sensor configured to provide feedback for actuation of the trim actuator. Actuation of the trim actuator can be controlled by the sensor, such that the reaction mass moves to compensate for a second portion of the load induced by the movement of the steerable platform.

In still another example, a reaction compensated steerable platform device is disclosed that can include a base, a steerable platform movably coupled to the base, and a reaction mass movably coupled to the base. The reaction compensated steerable platform device can also include a primary actuator coupled to the steerable platform and the base, and a secondary actuator coupled to the reaction mass and the base. The reaction mass can move to compensate for a first portion of a load induced by movement of the steerable platform caused by the primary actuator. The reaction compensated steerable platform device can further include a trim actuator coupled to the reaction mass and the base. In addition, the reaction compensated steerable platform device can include a sensor configured to provide feedback for actuation of the trim actuator. Actuation of the trim actuator can be controlled by the sensor, such that the reaction mass moves to compensate for a second portion of the load induced by the movement of the steerable platform.

In a further example, a reaction compensated steerable platform device is disclosed that can include a base. The reaction compensated steerable platform device can also include a steerable platform movably coupled to the base in two rotational degrees of freedom and a translational degree of freedom. The reaction compensated steerable platform device can further include a reaction mass movably coupled to the base in two rotational degrees of freedom and a translational degree of freedom. In addition, the reaction compensated steerable platform device can include an actuator coupled to the steerable platform and the reaction mass. Actuation of the actuator can cause the steerable platform and the reaction mass to move. The reaction mass can compensate for a load induced by the movement of the steerable platform.

Figure 1:
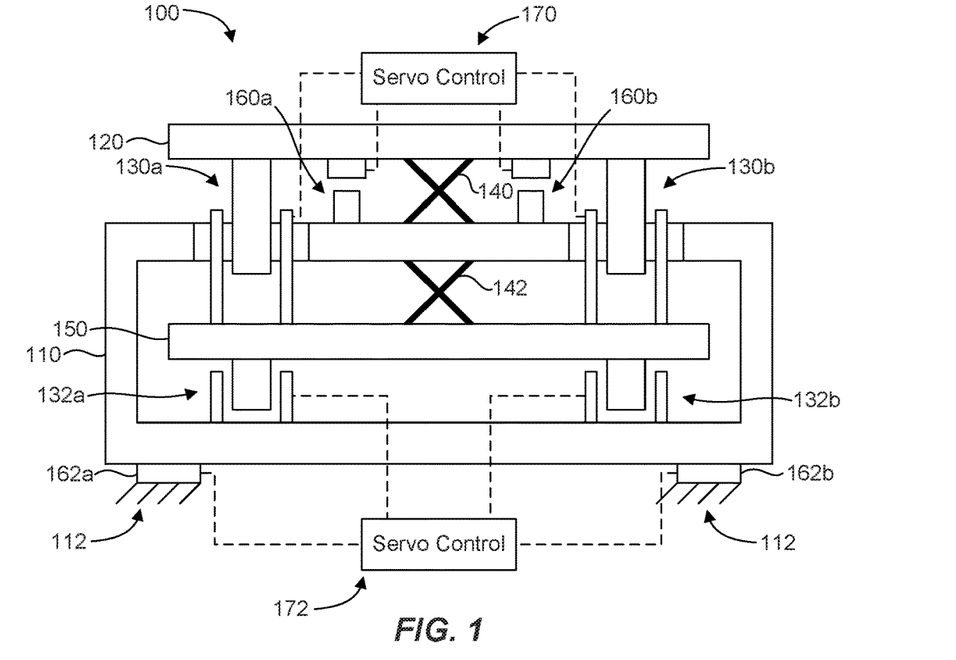
FIG. 1 is a schematic diagram of a two axis reaction compensated steerable platform device with a passive reaction mass configuration in accordance with an example of the present disclosure.

FIG. 1 illustrates a schematic diagram of a reaction compensated steerable platform device 100 in accordance with an example of the present disclosure. The device 100 can include a base 110 that can support various components of the reaction compensated steerable platform device 100, as described herein. The device 100 can also include a steerable platform 120 movably coupled to the base and one or more primary actuators 130a, 130b (e.g., force actuators) to cause movement of the steerable platform 120. The steerable platform 120 can be pivotally coupled to the base 110 by a connector assembly, which can include one or more connectors 140. The device 100 can also include a reaction mass 150 movably coupled to the base 110 to provide cancellation of loads (e.g., torques and/or forces) generated by movement of the steerable platform 120. The reaction mass 150 can be pivotally coupled to the base 110 by a connector assembly, which can include one or more connectors 142. The connectors 140, 142 can include any suitable type of connector or mechanism for providing pivotal or rotational movement, such as a flexible connector (e.g., a pivot flexure), a bearing connector (e.g., ball bearings), a bushing connector, etc. Thus, connectors referred to herein may include any suitable type of pivotal or rotational connector known in the art.

Figure 2:
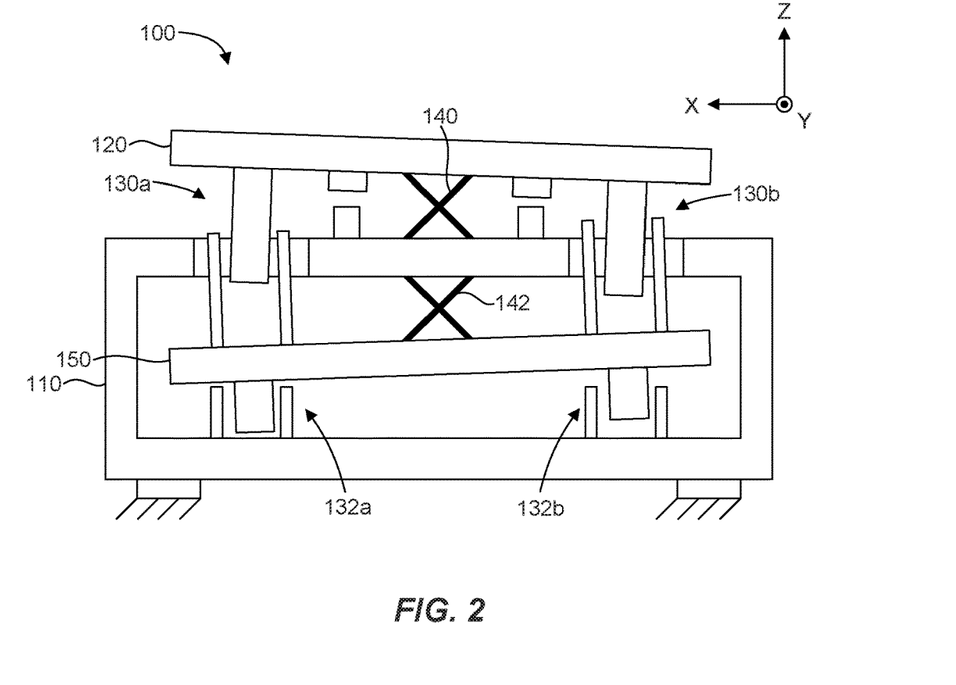
FIG. 2 illustrates tilting of the two axis reaction compensated steerable platform device of FIG. 1.
Figure 3A:
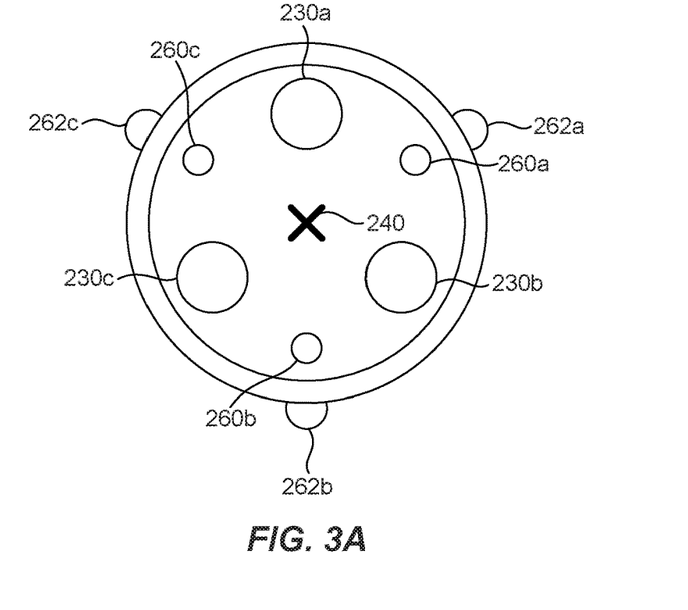
FIG. 3A is a schematic diagram top view of a two axis reaction compensated steerable platform device in accordance with an example of the present disclosure.
Figure 3B:
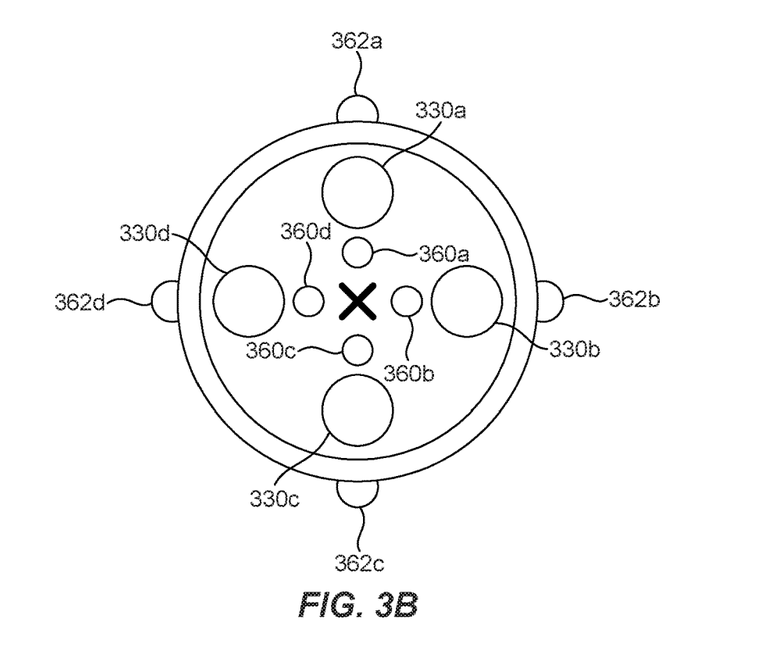
FIG. 3B is a schematic diagram top view of a two axis reaction compensated steerable platform device in accordance with another example of the present disclosure.

The one or more primary actuators 130a, 130b can comprise voice coil or similar force actuators, which can extend/retract to cause movement of the steerable platform 120. For example, the illustration of FIG. 1 shows primary actuators 130a, 130b on opposite sides of the connector 140. One primary actuator 130a can extend (i.e., "push") and the other primary actuator 130b can retract (i.e., "pull") to cause rotation of the steerable platform 120, such as about a y-axis, as shown in FIG. 2. A similar arrangement of primary actuators and a connector (not shown) can be included to facilitate rotation about another axis, such as the x-axis. Thus, primary actuators and connectors can be configured to provide for tilting of the steerable platform 120 in two dimensions or degrees of freedom. It should be recognized that any suitable number of primary actuators can be utilized, although, typically, a reaction compensated steerable platform device will include three or four primary actuators to facilitate rotation or angular movement of a steerable platform about two orthogonal axes. For example, as illustrated in FIG. 3A, three primary actuators 230a-c can be utilized and angularly spaced apart from one another at suitable angles, such as 120 degrees, although the primary actuators can be disposed in any angular configuration. In another example, illustrated in FIG. 3B, four primary actuators 330a-d can be utilized, such as two primary actuators per rotational degree of freedom. In the schematic top views of the reaction compensated steerable platform devices shown in FIGS. 3A and 3B, the steerable platforms have been omitted for clarity to illustrate components that would otherwise be obscured.

The connectors 140 can constrain the position of the steerable platform 120 in a manner, enabling the steerable platform 120 to be controlled while still allowing for freedom of motion in one or more degrees of freedom. The connectors 140 can have a certain degree of mechanical flexibility in combination with a degree of mechanical rigidity. Any suitable number of connectors 140 can be utilized in any suitable configuration to facilitate movement of the steerable platform in one or more degrees of freedom, such as rotational degrees of freedom about two orthogonal axes. For example, an individual connector 240 can be configured to provide movement in two degrees of freedom (FIGS. 3A and 3B), such as rotation about two axes. In another example, one or more connectors can be utilized to facilitate movement in a single rotational degree of freedom. In this case, an individual connector (e.g., a cross-blade flexure pivot, a pivot flex bearing, or ball bearing) can be configured to provide movement in only a single degree of freedom, such as rotation about an axis. In an additional example, three connectors can be utilized and angularly spaced apart from one another at suitable angles, such as 120 degrees, although the connectors can be disposed in any angular configuration. In this case, an individual connector can be configured to provide movement in two degrees of freedom (e.g., two rotational) or three degrees of freedom (e.g., two rotational and one translational), as discussed further below.

The connectors 140 and actuators 130a, 130b can therefore be utilized to adjust the tilt angle of the steerable platform 120 in the x-z plane and/or the y-z plane. Tilting in the x-z plane and the y-z plane may be referred to as a rotation about the y-axis and a rotation about the x-axis, respectively. The reaction mass 150 can be movably coupled to the base 110 (i.e., by suitable connectors 142) in a manner similar to the steerable platform 120 to provide for movement in similar degrees of freedom, such that the reaction mass 150 can move opposite the steerable platform 120 to compensate for loads induced by movement of the steerable platform 120.

In the example shown in FIG. 1, the primary actuators 130a, 130b can be coupled to the steerable platform 120 and the reaction mass 150, such that actuation of the primary actuators 130a, 130b causes both the steerable platform 120 and the reaction mass 150 to move. In this manner, the reaction mass 150 can compensate for loads induced by the movement of the steerable platform 120. Such a configuration is referred to as a "passive" reaction mass load cancellation configuration due to the reaction mass 150 moving passively in direct response to actuation of the steerable platform 120 by the primary actuators 130a, 130b. An "active" reaction mass load cancellation configuration is shown in FIGS. 7-10, where primary actuators cause a steerable platform to move and secondary actuators cause a reaction mass to move in opposition to the steerable platform. The active reaction mass configuration is discussed in more detail below.

In operation of the passive reaction mass configuration, actuation of the primary actuators 130a, 130b results in pivotal movement of the steerable platform 120 and the reaction mass 150 relative to one another. Thus, the actuators 130a, 130b push/pull the steerable platform 120 and the reaction mass 150 causing simultaneous movement of both the steerable platform 120 and the reaction mass 150, thus causing the steerable platform 120 and the reaction mass 150 to push/pull against one another thereby cancelling or offsetting loads induced by movement of the steerable platform 120.

The device 100 can include one or more position sensors 160a, 160b that can be mounted on the base 110 and/or the steerable platform 120 and used to monitor the position (e.g., the angular position) of the steerable platform 120 relative to the base 110. The primary actuators 130a, 130b can be controlled by a servo or control loop 170 using position feedback from the steerable platform 120 (e.g., the position sensors 160a, 160b between the steerable platform 120 and the base 110) and/or the reaction mass 150 (e.g., position sensors between the reaction mass and the base). A servo loop can be used to control actuation of the primary actuators 130a, 130b for movement of the steerable platform 120 in each degree of freedom. In one aspect, a control or servo loop for actuation of the primary actuators 130a, 130b can use external feedback from an optical sensor (e.g., a quad cell, a photopot, etc.) (not shown) measuring or sensing the steerable platform 120 and/or the reaction mass 150.

Any suitable number of position sensors 160a, 160b can be utilized in any suitable configuration to determine position of the steerable platform 120 in one or more degrees of freedom, such as rotational degrees of freedom about two orthogonal axes. For example, as illustrated in FIG. 3A, three position sensors 260a-c can be utilized and angularly spaced apart from one another at suitable angles, such as 120 degrees, although the position sensors can be disposed in any angular configuration. In another example, illustrated in FIG. 3B, four position sensors 360a-d can be utilized, such as two position sensors per rotational degree of freedom. The position sensors disclosed herein can be any suitable type of position sensor, such as an interferometric position sensor, an inductive position sensor, etc. In one aspect, the position sensors can be configured to determine the position of the steerable platform in one or more dimensions. Position sensors with a large dynamic range are desirable since such sensors can provide precise position information over a large range of distances.

While theoretically a passive reaction mass can cancel or offset all of the loads generated by movement of the steerable platform, such is not always the case in practice, which may become evident at higher speeds or frequencies. Thus, some portion of the loads generated by movement of the steerable platform may not be offset, thus leaving "residual" loads that are "exported" from a steerable platform device to a support structure for the device. For example, a steerable platform device may form a part of a FSM, which is mounted to a support structure of a satellite. Residual loads from the FSM can be exported to the support structure of the satellite, which can interfere with other components and systems of the satellite, such as by exciting structural vibration modes and causing unwanted structural vibrations.

To compensate for such residual loads, the device 100 can further include one or more trim actuators 132a, 132b coupled to the reaction mass 150 and the base 110, which can move the reaction mass 150 to reduce or eliminate residual or exported loads that may remain. The device 100 can include a sensor configured to provide feedback for actuation of the trim actuators 132a, 132b. In one aspect, the sensor can comprise one or more load sensors 162a, 162b (such as a force and/or torque sensor). The load sensors 162a, 162b can be coupled between the base 110 and a support structure (indicated by the fixed coupling at 112) for the device 100 to which the base 110 is coupled. A load sensor will be referred to generally as a sensor that can measure force and/or torque, which can be measured or sensed in any suitable manner. For example, a load sensor can measure or sense one or more quantities that may be used to derive a force or a torque. In a specific example, a load sensor can measure force in order to derive the torque.

Any suitable number of load sensors 162a, 162b can be utilized in any suitable configuration to determine loads in one or more degrees of freedom, such as rotational degrees of freedom about two orthogonal axes. For example, as illustrated in FIG. 3A, three load sensors 262a-c can be utilized and angularly spaced apart from one another at suitable angles, such as 120 degrees, although the load sensors can be disposed in any angular configuration. In another example, illustrated in FIG. 3B, four load 362a-d sensors can be utilized, such as two load sensors per rotational degree of freedom.

The device 100 can also include any suitable number of trim actuators 132a, 132b to cause movement of the reaction mass 150 in one or more degrees of freedom, such as movement in rotational degrees of freedom about two orthogonal axes. For example, three trim actuators can be utilized and angularly spaced apart from one another at suitable angles, such as 120 degrees, although the trim actuators can be disposed in any angular position or configuration. In another example, four trim actuators can be utilized, such as two trim actuators per rotational degree of freedom.

The actuators disclosed herein can be any suitable type of actuator, such as a voice coil actuator, a Lorenz force actuator, a current-mode actuator, an electrostrictive actuator, a piezoelectric actuator, a pneumatic actuator, a hydraulic actuator, an electromechanical screw-jack actuator, etc. In one example, a moveable support member fabricated using a spring to provide a repulsive force, and a solenoid to provide an attractive force can be used.

The trim actuators 132a, 132b can be controlled by a servo or control loop 172 using force and/or torque feedback from the load sensors 162a, 162b at the base mount (indicated at 112, e.g., between the base 110 and a support structure in support of the device 100). In operation, therefore, the reaction mass 150 can move by actuation of the primary actuators 130a, 130b, which is independent of actuation by the trim actuators 132a, 132b, to compensate for a first portion of a load induced by the movement of the steerable platform 120. The primary actuators 130a, 130b operate in a control loop 170 that can utilize position feedback of the steerable platform 120 and/or the reaction mass 150. Actuation of the trim actuators 132a, 132b can be controlled by the load sensors 162a, 162b, such that the reaction mass 150 moves to compensate for any second portion of the load induced by the movement of the steerable platform 120. Thus, the trim actuators 132a, 132b operate in a control loop 172 that can utilize force and/or torque feedback of the base 110 (which includes the base and everything supported by the base), in order to directly measure any existing residual or exported loads and move the reaction mass 150 to offset or cancel the residual loads. Thus, the device 100 does not rely on complete cancellation of loads by passive means. Instead, the device 100 gains benefit from the passive reaction mass load cancellation and utilizes the trim actuators 132a, 132b acting on the reaction mass 150 to "clean up" leftover or remaining loads, as measured by the load sensors 162a, 162b.

In a two axis device, two control loops can be utilized to control operation of the primary actuators. For example, one control loop for each axis using position feedback of the steerable platform 120 and/or the reaction mass 150 relative to the base 110. In addition, a two axis device can include two control loops to control operation of the trim actuators. For example, one control loop for each axis using load feedback at the base mounting location 112 with a supporting structure. In one aspect, the control or servo loop for actuation of the trim actuators can use information from one or more accelerometers located at a desired vibration sensitive interface or location.

Rather than relying on a typical passive reaction mass configuration to cancel all exported loads, the device 100 of the present disclosure has additional trim actuators 132a, 132b that act to directly cancel the residual loads based on measurement of the residual loads at the base mount 112 with a supporting structure for the device 100, utilizing the load as the feedback in the control loop 172. If everything is balanced, then no exported load is produced so the trim actuators 132a, 132b do nothing (i.e., use no power). The trim actuators 132a, 132b may only operate when needed to "trim" the excess exported loads, which will be small (i.e., low power when operating) in a passive reaction mass configuration and may only come into use at higher speeds or frequencies of operation of the steerable platform 120. Using feedback from the load sensors 162a, 162b to directly sense exported loads allows the reaction mass 150 to be independently controlled by the trim actuators 132a, 132b to directly cancel or eliminate the residual exported loads, which are already greatly reduced by the action of the primary actuators 130a, 130b driving both the steerable platform 120 and the reaction mass 150. Because the primary actuators 130a, 130b for the steerable platform 120 are between the steerable platform 120 and reaction mass 150 in a passive reaction mass configuration and the trim actuators 132a, 132b are dedicated to driving only the reaction mass 150 when residual loads are present, the primary actuators 130a, 130b nominally do all the work in moving the reaction mass 150. The trim actuators 132a, 132b may simply provide the capability to prevent the reaction mass 150 from hitting its travel stops (not shown), if desired. In addition, because the load induced by movement of the steerable platform 120 is nominally canceled by the motion of the reaction mass 150 driven by the primary actuators 130a, 130b, the trim actuators 132a, 132b require very little power to cancel the remaining residual exported loads. The device 100 is a hybrid between the passive and active approaches to load cancellation in that the device 100 has the power efficiency of the passive approach, but the control of the active approach. For example, utilizing shared actuators 130a, 130b to drive both the steerable platform 120 and reaction mass 150 to do >95% of the mechanical work reduces input power by almost 50% compared to using dedicated actuators to drive each of the steerable platform 120 and the reaction mass 150 separately.

In some embodiments, an optical assembly (not shown) will be mounted to the steerable platform 120 to provide a steerable mirror (e.g., FSM). By way of example, the steerable mirror can have a reflective surface, such as in the shape of an annulus as can be found in telescopes commonly referred to as Cassegrain telescopes. The reaction compensated steerable platform device 100 can be utilized in other applications as well, such as air or space borne telescopes, laser systems, laser radar systems, and the like. The technology has been found particularly effective as a platform to support a mirror for line-of-sight scanning and stabilization or other precision pointing uses. Accordingly, in one aspect, the steerable platform 120 and/or the base 110 can be configured to provide a rigid support for an optical assembly.

Figure 4:
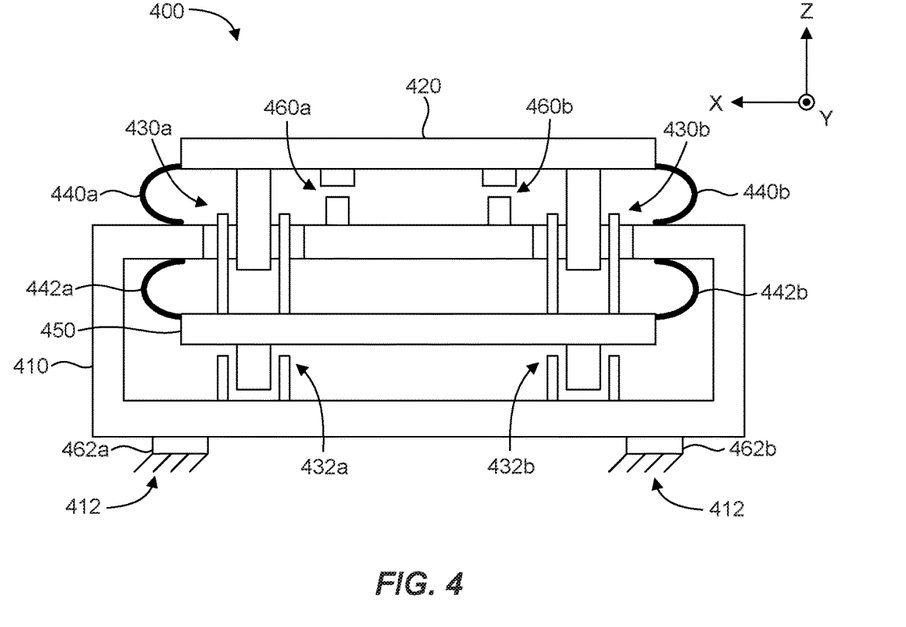
FIG. 4 is a schematic diagram of a three axis reaction compensated steerable platform device with a passive reaction mass configuration in accordance with an example of the present disclosure.

FIG. 4 illustrates a schematic diagram of a reaction compensated steerable platform device 400 in accordance with another example of the present disclosure. The device 400 is similar to the device 100 in many respects, such as utilizing a passive reaction mass configuration with a trim actuator 432a, 432b for a reaction mass 450 controlled by feedback from a load sensor 462a, 462b between a base 410 and a supporting structure (at 412). In this case, connectors 440a, 440b of a steerable platform 420 to the base 410 and connectors 442a, 442b of the reaction mass 450 to the base 410 are configured to facilitate relative movement in a translational degree of freedom, in addition to one or more rotational degrees of freedom. Furthermore, the primary actuators 430a, 430b and the trim actuators 432a, 432b can be configured to "piston" (e.g., provide a linear stroke) in order to provide movement of the steerable platform 420 and the reaction mass 450 in a translational degree of freedom, in addition to one or more rotational degrees of freedom, thus providing a three axis device. Accordingly, position sensors 460a, 460b of the device 400 can be configured to sense position in the three degrees of freedom (two rotational and one translational) to provide position feedback for the primary actuators 430a, 430b. The piston action of the actuators can cause movement of the steerable platform 420 (e.g., to provide pivoting about a virtual pivot point) that results in residual force as well as torque that may be exported from the device 400. Accordingly, the load sensors 462a, 462b of the device 400 can be configured to sense loads in the three degrees of freedom (two rotational and one translational) to provide load feedback for the trim actuators 432a, 432b to facilitate cancelling or offsetting residual loads in three degrees of freedom.

In one example, the connectors can comprise a C-flexure, a U-flexure, a J-flexure, or the like. The connector in this example can be formed in the shape of the letter "C", "U", or "J" to provide flexibility in the z-direction. Such connectors can act as a constraint on the position of the steerable platform 420 or the reaction mass 450, yet can be flexible in the z-direction, enabling the supported structure to translate in the z-direction. The connectors can also be pivotal or rotatable about one or more axes of rotation, such as about the x-axis and/or y-axis. A connector can include any suitable device or mechanism to provide movement in a translational degree of freedom, such as a linkage mechanism or a linear bearing.

Figure 5:
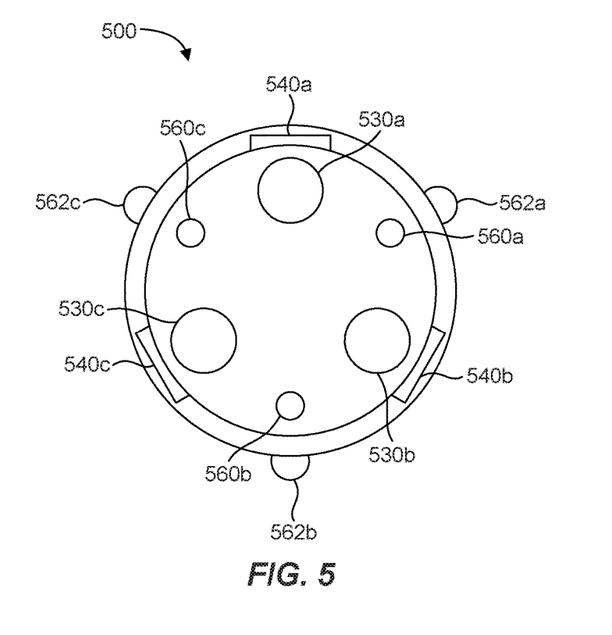
FIG. 5 is a schematic diagram top view of a three axis reaction compensated steerable platform device in accordance with an example of the present disclosure.

As with other examples, a three axis device 500 can have actuators 530a-c (trim actuators obscured from view), position sensors 560a-c, load sensors 562a-c, and connectors 540a-c included in any suitable quantity and configuration, such as having three of each type of component disposed at 120 degrees from one another, as illustrated in FIG. 5.

Figure 6:
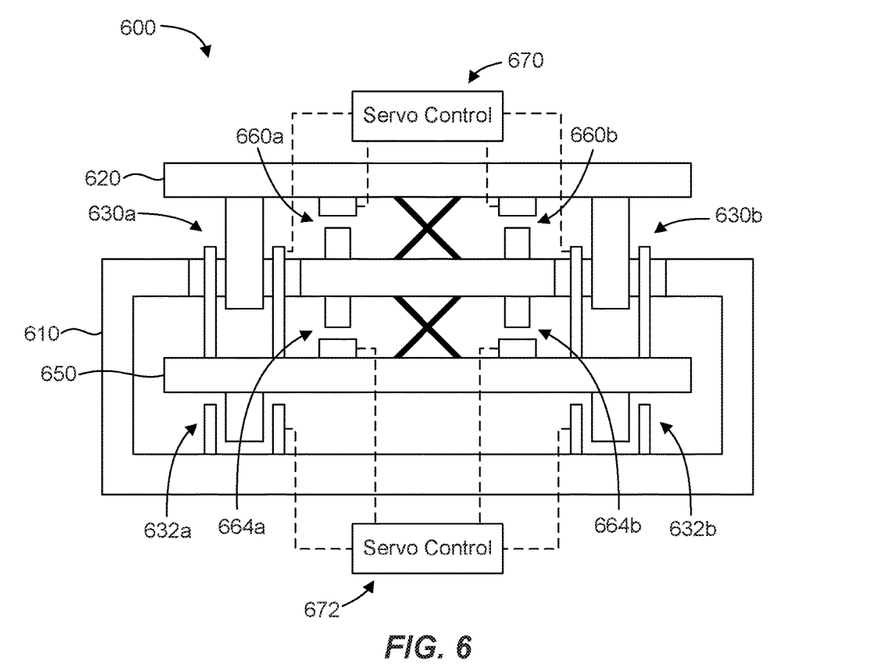
FIG. 6 is a schematic diagram of a two axis reaction compensated steerable platform device with a passive reaction mass configuration in accordance with another example of the present disclosure.

FIG. 6 illustrates a schematic diagram of a reaction compensated steerable platform device 600 in accordance with another example of the present disclosure. The device 600 is similar to the devices 100 and 400 in many respects, such as utilizing a passive reaction mass configuration with a trim actuator 632a, 632b for a reaction mass 650, which is controlled by feedback from a sensor. In this case, instead of utilizing a load sensor between a base and a supporting structure, one or more position sensors 664a, 664b associated with a base 610 and/or the reaction mass 650 can be used to provide feedback on the position of the reaction mass 650 to control the trim actuators 632a, 632b. For example, the position sensors 664a, 664b can be coupled between the base 610 and the reaction mass 650. Thus, the position of the steerable platform 620 can be determined by one or more position sensors 660a, 660b associated with the base 610 and/or the steerable platform 620, and the position of the reaction mass 650 can be determined by the position sensors 664a, 664b associated with the base 610 and/or the reaction mass 650.

In operation, actuation of the primary actuators 630a, 630b will cause both the steerable platform 620 and the reaction mass 650 to move. The primary actuators 630a, 630b can be controlled by a servo or control loop 670 using position feedback from the steerable platform 620 (e.g., the position sensors 660a, 660b between the steerable platform 620 and the base 610). In theory, the steerable platform 620 and the reaction mass 650 will move in opposite directions by equal but opposite torque. In practice, however, the reaction mass 650 torque will not be equal and opposite to the steerable platform 620 torque. The differences in torque can cause errors in movement, which can be measured using the steerable platform position sensors 660a, 660b and the reaction mass position sensors 664a, 664b. The reaction mass position sensors 664a, 664b can therefore provide feedback via a control loop 672 for actuation of the trim actuators 632a, 632b to cause the reaction mass 650 torque to be equal but opposite the steerable platform 620 torque, thereby compensating for a residual portion of the load induced by the movement of the steerable platform 620 that was not cancelled out by the passive movement of the reaction mass 650 caused by the primary actuators 630a, 630b. In one aspect, using position feedback to control operation of the trim actuators 632a, 632b can prevent or minimize gradual drift of the reaction mass 650 off its null position, and/or prevent the reaction mass 650 from hitting a travel stop.

The reaction compensated steerable platform device 600 is an example of a two axis device (e.g., rotation about two orthogonal axes).

Figure 7:
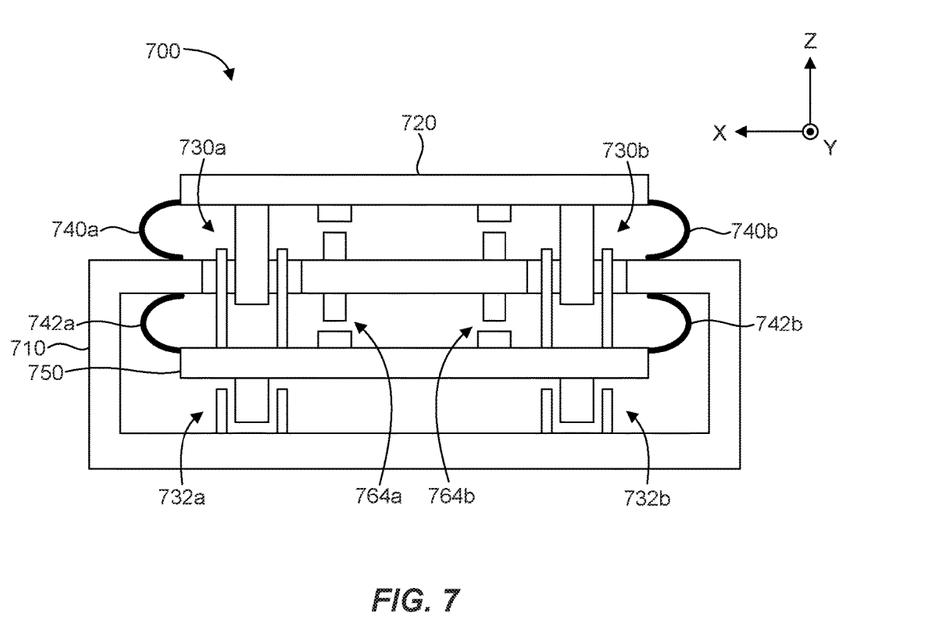
FIG. 7 is a schematic diagram of a three axis reaction compensated steerable platform device with a passive reaction mass configuration in accordance with another example of the present disclosure.

FIG. 7 illustrates a schematic diagram of a reaction compensated steerable platform device 700 in accordance with another example of the present disclosure. The device 700 is similar to the device 600 in many respects, such as utilizing a passive reaction mass configuration with a trim actuator 732a, 732b for a reaction mass 750, which is controlled by feedback from a position sensor 764a, 764b. In this case, connectors 740a, 740b of a steerable platform 720 to a base 710 and connectors 742a, 742b of the reaction mass 750 to the base 710 (e.g., a C-flexure, a U-flexure, a J-flexure, etc.) are configured to facilitate relative movement in a translational degree of freedom (e.g., the z-direction), in addition to one or more rotational degrees of freedom. Furthermore, primary actuators 730a, 730b and the trim actuators 732a, 732b can be configured to "piston" (e.g., provide a linear stroke) in order to provide movement of the steerable platform 720 and the reaction mass 750 in a translational degree of freedom, in addition to one or more rotational degrees of freedom, thus providing a three axis device.

Thus, devices utilizing a passive reaction mass configuration as described herein can have a sensor (e.g., a load sensor and/or a position sensor) configured to provide feedback for actuation of a trim actuator, which causes a reaction mass to move to compensate for residual or exported loads induced by the movement of a steerable platform that are not compensated for by the passive movement of the reaction mass.

Figure 8:
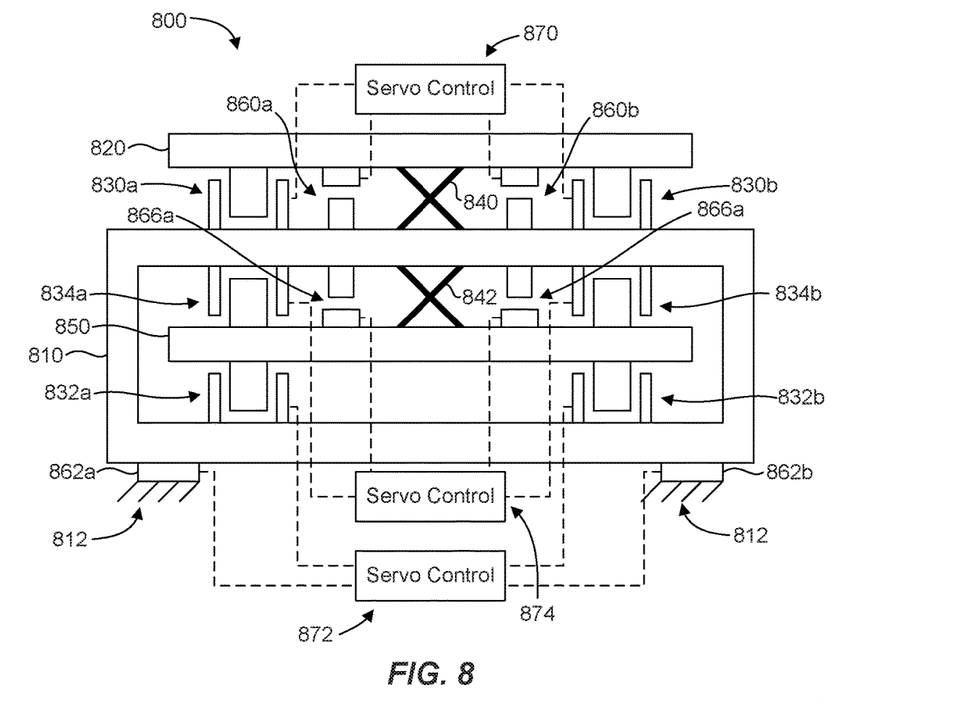
FIG. 8 is a schematic diagram of a two axis reaction compensated steerable platform device with an active reaction mass configuration in accordance with an example of the present disclosure.

FIG. 8 illustrates a schematic diagram of a reaction compensated steerable platform device 800 in accordance with another example of the present disclosure. The device 800 can include a base 810 that can support various components of the reaction compensated steerable platform device 800, as described herein. The device 800 can also include a steerable platform 820 movably coupled to the base 810 and one or more primary actuators 830a, 830b to cause movement of the steerable platform 820. The steerable platform 820 can be pivotally coupled to the base 810 by a connector assembly, which can include one or more connectors 840 (e.g., a pivot flexure). The device 800 can also include a reaction mass 850 movably coupled to the base 810 and one or more secondary actuators 834a, 834b to cause movement of the reaction mass 850. As with other examples disclosed herein, the reaction mass 850 can provide cancellation of loads (e.g., torques and/or forces) generated by movement of the steerable platform 820. The reaction mass 850 can be pivotally coupled to the base 810 by a connector assembly, which can include one or more connectors 842 (e.g., a pivot flexure).

Figure 9:
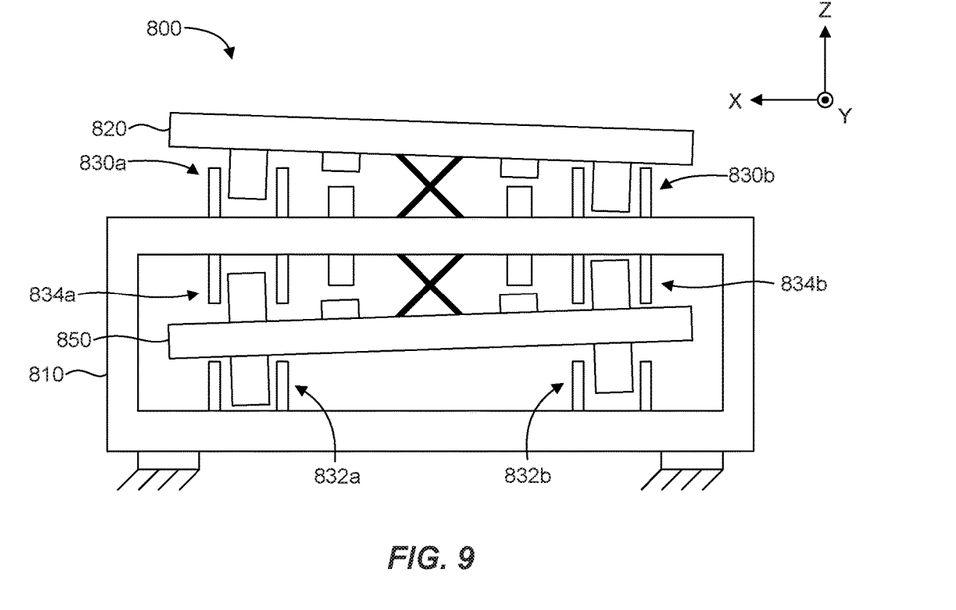
FIG. 9 illustrates tilting of the two axis reaction compensated steerable platform device of FIG. 8.

In the example shown in FIG. 8, the primary actuators 830a, 830b can be coupled to the base 810 and the steerable platform 820, such that actuation of the primary actuators 830a, 830b causes the steerable platform 820 to move, such as about an axis (e.g., y-axis) (FIG. 9). The secondary actuators 834a, 834b can be coupled to the base 810 and the reaction mass 850, such that actuation of the secondary actuators 834a, 834b causes the reaction mass 850 to move, such as about an axis (e.g., y-axis) (FIG. 9). The device 800 can include one or more position sensors 860a, 860b that can be mounted on the base 810 and/or the steerable platform 820 and used to monitor the position (e.g., the angular position) of the steerable platform 820 relative to the base 810. One or more position sensors 866a, 866b can also be mounted on the base 810 and/or the reaction mass 850 to monitor the position (e.g., the angular position) of the reaction mass 850 relative to the base 810. The primary actuators 830a, 830b can be controlled by a servo or control loop 870 using position feedback from the steerable platform 820 (e.g., the position sensors 860a, 860b between the steerable platform 820 and the base 810). The secondary actuators 834a, 834b can be controlled by a servo or control loop 874 using position feedback from the reaction mass 850 (e.g., the position sensors 866a, 866b between the reaction mass 850 and the base 810).

In operation, the movement of the steerable platform 820 as caused by the primary actuators 830a, 830b can be measured using the steerable platform position sensors 860a, 860b. The reaction mass position sensors 866a, 866b can therefore provide feedback for actuation of the secondary actuators 834a, 834b to cause the reaction mass 850 and the steerable platform 820 to move with equal torque but in opposite directions, thereby compensating for loads induced by the movement of the steerable platform 820. In this manner, the reaction mass 850 can compensate for loads induced by the movement of the steerable platform 820. Such a configuration is referred to as an "active" reaction mass load cancellation configuration due to the secondary actuators 834a, 834b actively causing the reaction mass 850 to move in opposition to the steerable platform 820, which is caused to move by the primary actuators 830a, 830b. Thus, through the use of the secondary actuators 834a, 834b and the position sensors 866a, 866b associated with the active reaction mass 850, the motion of the reaction mass 850 can actively counteract reactive forces and torques caused by the motion of the steerable platform 820.

A servo loop can be used to control actuation of the primary actuators 830a, 830b for movement of the steerable platform 820 in each degree of freedom. Similarly, a servo loop can be used to control actuation of the secondary actuators 834a, 834b for movement of the reaction mass 850 in each degree of freedom. In one aspect, the control or servo loop for actuation of the primary and/or secondary actuators can use external feedback from an optical sensor (e.g., a quad cell, a photopot, etc.) measuring or sensing the steerable platform 820 and/or the reaction mass 850.

Although the active reaction mass can cancel or offset much of the loads generated by movement of a steerable platform, there is often some portion of the loads generated by movement of the steerable platform that are not offset due to imperfections, tolerances, and/or out-of-phase movement, leaving residual loads that may be exported from a steerable platform device to a support structure for the device. Thus, the device 800 can include one or more trim actuators 832a, 832b coupled to the reaction mass 850 and the base 810, which can move the reaction mass 850 to reduce or eliminate residual or exported loads that may remain of the loads induced by movement of the steerable platform 820. The device 800 can include a load sensor 862a, 862b (such as a force and/or torque sensor) configured to provide feedback via a servo or control loop 872 for controlling actuation of the trim actuators 832a, 832b. The load sensor 862a, 862b can be coupled between the base 810 and a support structure (at 812) for the device 800 to which the base 810 is coupled.

The device 800 can include any suitable number of primary actuators 830a, 830b and trim actuators 832a, 832b, as described herein. Similarly, the device 800 can include any suitable number of secondary actuators 834a, 834b to cause movement of the reaction mass 850 in one or more degrees of freedom, such as movement in rotational degrees of freedom about two orthogonal axes. For example, three secondary actuators can be utilized and angularly spaced apart from one another at suitable angles, such as 120 degrees, although the secondary actuators can be disposed in any angular configuration. In another example, four secondary actuators can be utilized, such as two secondary actuators per rotational degree of freedom.

The reaction compensated steerable platform device 800 is an example of a two axis device (e.g., rotation about two orthogonal axes).

Figure 10:
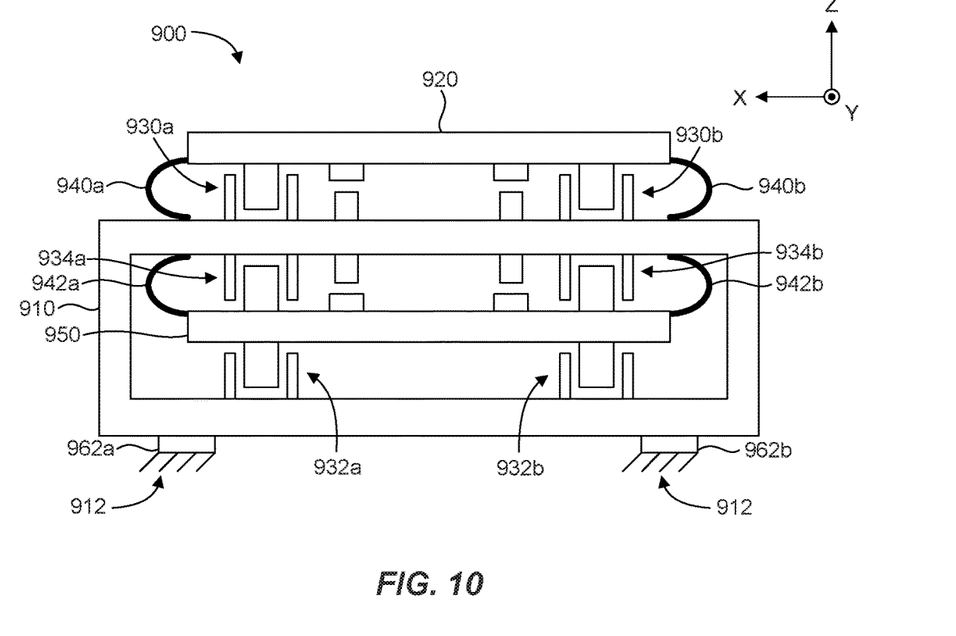
FIG. 10 is a schematic diagram of a three axis reaction compensated steerable platform device with an active reaction mass configuration in accordance with an example of the present disclosure.

FIG. 10 illustrates a schematic diagram of a reaction compensated steerable platform device 900 in accordance with another example of the present disclosure. The device 900 is similar to the device 800 in many respects, such as utilizing an active reaction mass configuration with a trim actuator 932a, 932b for a reaction mass 950 controlled by feedback from a load sensor 962a, 962b between a base 910 and a supporting structure (at 912). In this case, connectors 940a, 940b of a steerable platform 920 to the base 910 and connectors 942a, 942b of the reaction mass 950 to the base 910 (e.g., a C-flexure, a U-flexure, a J-flexure, etc.) are configured to facilitate relative movement in a translational degree of freedom (e.g., the z-direction), in addition to one or more rotational degrees of freedom. Furthermore, primary actuators 930a, 930b, secondary actuators 934a, 934b, and the trim actuators 932a, 932b can be configured to piston (e.g., a linear stroke) to provide movement of the steerable platform 920 and the reaction mass 950 in a translational degree of freedom, in addition to one or more rotational degrees of freedom, thus providing a three axis device.

Thus, devices utilizing a passive or an active reaction mass configuration as described herein can have a sensor (e.g., a load sensor) configured to provide feedback for actuation of a trim actuator, which causes a reaction mass to move to compensate for residual or exported loads induced by the movement of a steerable platform that are not compensated for by the passive or active movement of the reaction mass.

Figure 11:
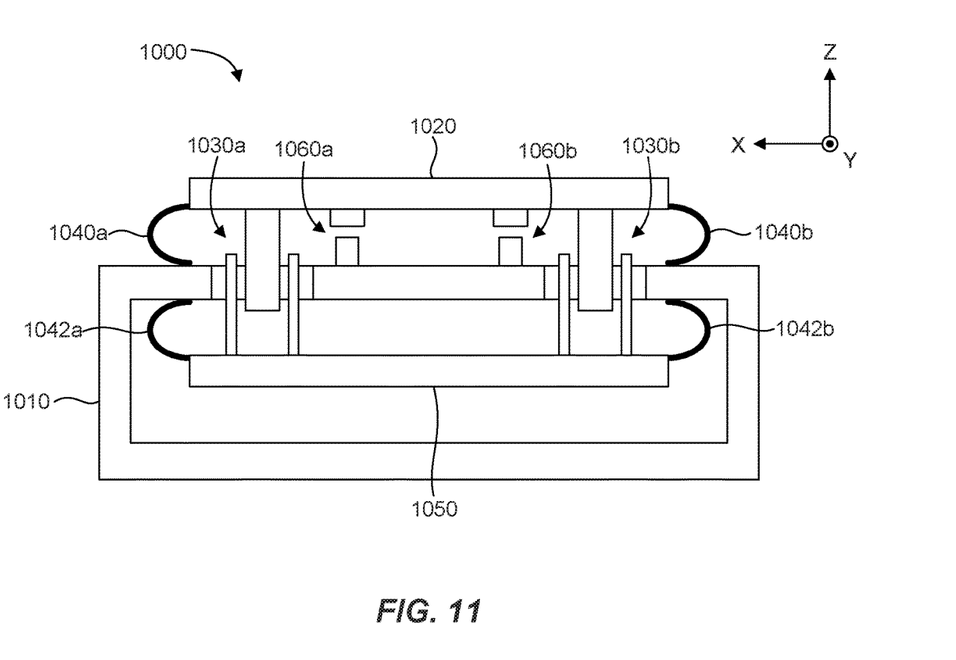
FIG. 11 is a schematic diagram of a three axis reaction compensated steerable platform device with a passive reaction mass configuration in accordance with another example of the present disclosure.

FIG. 11 illustrates a schematic diagram of a reaction compensated steerable platform device 1000 in accordance with another example of the present disclosure. The device 1000 can include a base 1010 that can support various components of the reaction compensated steerable platform device 1000, as described herein. The device 1000 can also include a steerable platform 1020 movably coupled to the base 1010. The steerable platform 1020 can be pivotally coupled to the base 1010 by a connector assembly, which can include one or more connectors 1040a, 1040b (e.g., a pivot flexure). The device 1000 can also include a reaction mass 1050 movably coupled to the base to provide cancellation of loads (e.g., torques and/or forces) generated by movement of the steerable platform 1020. The reaction mass 1050 can be pivotally coupled to the base 1010 by a connector assembly, which can include one or more connectors 1042a, 1042b (e.g., a pivot flexure). One or more actuators 1030a, 1030b (e.g., force actuators) can be coupled to the steerable platform 1020 and the reaction mass 1050. The device 1000 utilizes a passive reaction mass configuration. Thus, in operation, actuation of the actuators 1030a, 1030b will cause both the steerable platform 1020 and the reaction mass 1050 to move, with the reaction mass 1050 compensating for loads induced by the movement of the steerable platform 1020. The position of the steerable platform 1020 can be determined by one or more position sensors 1060a, 1060b associated with the base 1010 and/or the steerable platform 1020.

The connectors 1040a, 1040b of the steerable platform 1020 to the base 1010 and the connectors 1042a, 1042b of the reaction mass 1050 to the base 1010 (e.g., a C-flexure, a U-flexure, a J-flexure, etc.) are configured to facilitate relative movement in a translational degree of freedom (e.g., the z-direction), in addition to one or more rotational degrees of freedom. Furthermore, the actuators 1030a, 1030b can be configured to piston (e.g., a linear stroke) to provide movement of the steerable platform 1020 and the reaction mass 1050 in a translational degree of freedom, in addition to one or more rotational degrees of freedom, thus providing a three axis device.

The device 1000 can include any suitable number of actuators 1030a, 1030b to cause movement of the steerable platform 1020 and the reaction mass 1050 in one or more degrees of freedom, such as movement in rotational degrees of freedom about two orthogonal axes and a translational degree of freedom. For example, three actuators can be utilized and angularly spaced apart from one another at suitable angles, such as 120 degrees, although the actuators can be disposed in any angular configuration. In another example, four actuators can be utilized, such as two actuators per rotational degree of freedom. The actuators 1030a, 1030b can actuate simultaneously to piston and/or extend/retract.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A reaction compensated steerable platform device, comprising:
   a base;
   a steerable platform movably coupled to the base;
   a reaction mass movably coupled to the base;
   a primary actuator to cause movement of the steerable platform;
   a trim actuator coupled to the reaction mass and the base; and
   a sensor coupled to the base and configured to be disposed between the base and a support structure for the reaction compensated steerable platform device, the sensor being operable to provide feedback for actuation of the trim actuator,
   wherein the reaction mass is configured to move by actuation independent of the trim actuator to compensate for a first portion of a load induced by the movement of the steerable platform, and
   wherein actuation of the trim actuator is controlled by the sensor, such that the reaction mass moves to compensate for a second portion of the load induced by the movement of the steerable platform.

2. The reaction compensated steerable platform device of claim 1, wherein the sensor comprises at least one of a load sensor and an accelerometer.

3. The reaction compensated steerable platform device of claim 2, wherein the load sensor comprises a force sensor.

4. The reaction compensated steerable platform device of claim 1, wherein the primary actuator is coupled to the steerable platform and the reaction mass, wherein actuation of the primary actuator causes the steerable platform and the reaction mass to move, the reaction mass compensating for the first portion of the load induced by the movement of the steerable platform.

5. The reaction compensated steerable platform device of claim 1, further comprising a secondary actuator coupled to the reaction mass and the base, wherein the secondary actuator causes the reaction mass to move to compensate for the first portion of the load induced by the movement of the steerable platform caused by the primary actuator.

6. The reaction compensated steerable platform device of claim 5, wherein the secondary actuator comprises at least three secondary actuators.

7. The reaction compensated steerable platform device of claim 1, wherein the primary actuator comprises at least three primary actuators.

8. The reaction compensated steerable platform device of claim 1, wherein the trim actuator comprises at least three trim actuators.

9. The reaction compensated steerable platform device of claim 1, wherein the steerable platform is movably coupled to the base by a flexure pivot, a bearing, a bushing, or a combination thereof.

10. The reaction compensated steerable platform device of claim 1, wherein the reaction mass is movably coupled to the base by a flexure pivot, a bearing, a bushing, or a combination thereof.

11. The reaction compensated steerable platform device of claim 1, wherein each of the couplings of the steerable platform and the reaction mass to the base facilitate relative movement in two rotational degrees of freedom.

12. The reaction compensated steerable platform device of claim 11, wherein each of the couplings of the steerable platform and the reaction mass to the base facilitate relative movement in a translational degree of freedom.

13. The reaction compensated steerable platform device of claim 1, wherein the steerable platform is movably coupled to the base by a C-flexure, a U-flexure, a J-flexure, or a combination thereof.

14. The reaction compensated steerable platform device of claim 1, wherein the reaction mass is movably coupled to the base by a C-flexure, a U-flexure, a J-flexure, or a combination thereof.

15. A reaction compensated steerable platform device, comprising:
   a base;
   a steerable platform movably coupled to the base;
   a reaction mass movably coupled to the base;
   a primary actuator coupled to the steerable platform and the reaction mass, wherein actuation of the primary actuator causes the steerable platform and the reaction mass to move, the reaction mass compensating for a first portion of a load induced by the movement of the steerable platform;
   a trim actuator coupled to the reaction mass and the base; and
   a sensor coupled to the base and configured to be disposed between the base and a support structure for the reaction compensated steerable platform device, the sensor being operable to provide feedback for actuation of the trim actuator,
   wherein actuation of the trim actuator is controlled by the sensor, such that the reaction mass moves to compensate for a second portion of the load induced by the movement of the steerable platform.

16. The reaction compensated steerable platform device of claim 15, wherein the sensor comprises at least one of a load sensor and an accelerometer.

17. The reaction compensated steerable platform device of claim 15, wherein each of the couplings of the steerable platform and the reaction mass to the base facilitate relative movement in two rotational degrees of freedom.

18. The reaction compensated steerable platform device of claim 17, wherein each of the couplings of the steerable platform and the reaction mass to the base facilitate relative movement in a translational degree of freedom.

19. A reaction compensated steerable platform device, comprising:
   a base;
   a steerable platform movably coupled to the base;
   a reaction mass movably coupled to the base;
   a primary actuator coupled to the steerable platform and the base;
   a secondary actuator coupled to the reaction mass and the base, wherein the reaction mass moves to compensate for a first portion of a load induced by movement of the steerable platform caused by the primary actuator;
   a trim actuator coupled to the reaction mass and the base; and
   a sensor coupled to the base and configured to be disposed between the base and a support structure for the reaction compensated steerable platform device, the sensor being operable to provide feedback for actuation of the trim actuator,
   wherein actuation of the trim actuator is controlled by the sensor, such that the reaction mass moves to compensate for a second portion of the load induced by the movement of the steerable platform.

20. The reaction compensated steerable platform device of claim 19, wherein the sensor comprises at least one of a load sensor and an accelerometer.

21. The reaction compensated steerable platform device of claim 19, wherein each of the couplings of the steerable platform and the reaction mass to the base facilitate relative movement in two rotational degrees of freedom.

22. The reaction compensated steerable platform device of claim 21, wherein each of the couplings of the steerable platform and the reaction mass to the base facilitate relative movement in a translational degree of freedom.

* * * * *